(12) United States Patent
Hartwell et al.

(10) Patent No.: US 7,342,575 B1
(45) Date of Patent: Mar. 11, 2008

(54) ELECTRONIC WRITING SYSTEMS AND METHODS

(75) Inventors: Peter G. Hartwell, Sunnyvale, CA (US); Steven Rosenberg, Palo Alto, CA (US); Steven L Naberhuis, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 757 days.

(21) Appl. No.: 10/818,599

(22) Filed: Apr. 6, 2004

(51) Int. Cl.
*G09G 5/00* (2006.01)

(52) U.S. Cl. .................. 345/179; 382/314; 178/19.05

(58) Field of Classification Search ........... 345/158, 345/179; 178/19.05; 382/314
See application file for complete search history.

(56) References Cited

U.S. PATENT DOCUMENTS

| | | | |
|---|---|---|---|
| 6,105,427 A | 8/2000 | Stewart et al. | |
| 6,181,329 B1 | 1/2001 | Stork et al. | |
| 6,188,392 B1 | 2/2001 | O'Connor et al. | |
| 6,310,988 B1 | 10/2001 | Flores et al. | |
| 6,492,981 B1 | 12/2002 | Stork et al. | |
| 6,567,076 B2 | 5/2003 | Yeh | |
| 6,650,320 B1 | 11/2003 | Zimmerman | |
| 6,724,374 B1* | 4/2004 | Lapstun et al. | 345/179 |
| 6,776,042 B2 | 8/2004 | Pike et al. | |
| 2001/0038383 A1* | 11/2001 | Ericson et al. | 345/173 |
| 2002/0107885 A1 | 8/2002 | Brooks et al. | |
| 2003/0078700 A1 | 4/2003 | Chee | |
| 2003/0146906 A1 | 8/2003 | Lin | |

FOREIGN PATENT DOCUMENTS

| WO | WO0031682 | * | 6/2000 |
|---|---|---|---|
| WO | WO03/060684 | | 7/2003 |

* cited by examiner

Primary Examiner—Amr A. Awad
Assistant Examiner—Tom V Sheng (57) ABSTRACT

Electronic writing systems and methods are described. In one aspect, an electronic writing system includes an elongated housing, an inertial sensor, an optical sensor, and a tracking module. The elongated housing has an optical input. The inertial sensor is attached to the housing and is operable to generate data indicative of movement of the housing relative to an inertial reference frame. The optical sensor is attached to the housing and is operable to generate data from light received through the optical input. The tracking module is operable to compute relative displacement data from inertial movement data corresponding to data generated by the inertial sensor. The tracking module also is operable to detect at least one calibrated position from calibration data encoded in optical data generated from light received by the optical sensor.

28 Claims, 3 Drawing Sheets

ELECTRONIC WRITING SYSTEMS AND METHODS

BACKGROUND

A wide variety of electronic writing systems have been proposed. In general, an electronic writing system allows a user to interface with a computer or other electronic device using a writing instrument (often referred to as a "digital pen" or a "stylus"). The electronic writing system includes means for recording the positions of the writing instrument across a substrate over time. These positions are recorded as strokes or traces. The recorded traces may be stored in the form of a virtual copy of the original movements of the writing instrument or they may be interpreted by the electronic writing system. For example, the recorded traces may be interpreted by a handwriting recognition system, which converts the traces into text input. In some implementations, an electronic writing instrument also is configured to mark a substrate with ink or other marking agent, thereby providing a hard copy of the paths traversed by the electronic instrument at the same time the virtual copies of the paths are recorded.

In one approach, a digital pen has an ink writing tip that includes a light source in a pen body that directs light toward paper over which the writing tip is moved. A camera mounted in the pen body captures images of areas of the paper that are illuminated by the light source. A processor in the pen body determines pen motion based on the captured images. A contact sensor in the pen body senses when the tip is pressed against the paper, with positions being recorded on a nonvolatile memory in the pen body only when the contact sensor indicates that the pen is pressed against the paper. Periodically, key frame images captured by the camera are stored in memory. The memory may be attached to a handwriting recognition device, which correlates the key frames and positions to alpha-numeric characters. The digital pen may be used with ordinary paper, quad-ruled paper, and special bar-coded paper that allows the system to determine absolute pen position.

In another approach, an electronic writing device includes an elongated housing that has a tip configured to contact a surface. The electronic writing device also includes a pressure sensor disposed within the housing. The pressure sensor is coupled to the tip and is configured to detect when the tip contacts the surface. The electronic writing device further includes first and second acceleration sensors disposed within the housing and adjacent the tip of the marking device. The first and second acceleration sensors are configured to sense acceleration of the tip in first and second directions. Responsive to the sensing of acceleration, the first and second acceleration sensors generate first and second signals indicative of acceleration in first and second directions. The electronic writing device also includes a conversion device, such as an analog-to-digital converter, that converts the first and second signals into at least one computer readable signal that is used to generate data relating to the motion of the housing.

SUMMARY

In one aspect, the invention features an electronic writing system that includes an elongated housing, an inertial sensor, an optical sensor, and a tracking module. The elongated housing has an optical input. The inertial sensor is attached to the housing and is operable to generate data indicative of movement of the housing relative to an inertial reference frame. The optical sensor is attached to the housing and is operable to generate data from light received through the optical input. The tracking module is operable to compute relative displacement data from inertial movement data corresponding to data generated by the inertial sensor. The tracking module also is operable to detect at least one calibrated position from calibration data encoded in optical data generated from light received by the optical sensor.

The invention also features a device-implemented electronic writing method. In accordance with this inventive method, inertial data indicative of movement of an elongated housing of an electronic writing instrument relative to an inertial reference frame is generated. Optical data is generated from light received through an optical input of the housing. Relative displacement data is computed from the inertial data. At least one calibrated position is detected from calibration data encoded in the optical data.

In another aspect, the invention also features a machine-readable medium storing machine-readable instructions. The instructions cause a machine to compute relative displacement data from inertial data indicative of movement of an elongated housing of an electronic writing instrument relative to an inertial reference frame. The instructions also cause the machine to detect at least one calibrated position from calibration data encoded in optical data generated from light received through an optical input of the housing. The instructions additionally cause a machine to compute a trace corresponding to a path followed by an end of the housing across a writing surface from the relative displacement data and the at least one detected calibrated position.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
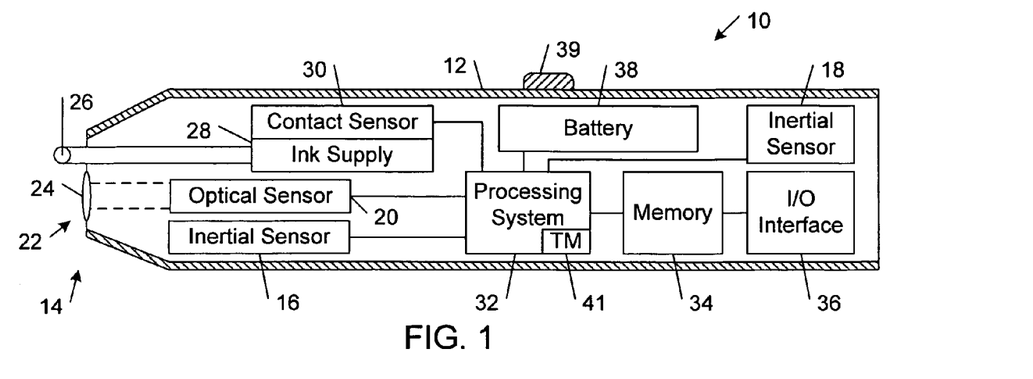
FIG. 1 is a block diagram of an embodiment of an electronic writing device.

FIG. 1 shows an embodiment of an electronic writing device 10 that includes an elongated housing 12 that is sized and shaped in the form of a writing instrument (e.g., a pen, pencil, or stylus). In operation, a user moves a writing end 14 of the electronic writing device 10 along a path across the surface of a writing medium that includes a set of optically detectable calibration marks (or signposts), which designate absolute positions on the writing medium. In response, the electronic writing device 10 generates data for tracking the movement of the writing end 14 of the electronic writing device 10 and detects calibration marks carried by the writing medium that intersect the path traversed by the writing end 14 of the electronic writing device 10. The tracked movement data is calibrated to the detected calibration marks to provide calibrated movement data. The embodiments described in detail below combine relative motion sensing technology with absolute position sensing technology to track movements of the writing end 14 of the electronic writing device 10 with high accuracy.

In the embodiment of FIG. 1, relative motions of the writing end 14 of the electronic writing device 10 are sensed by an inertial sensor 16, which is operable to generate data indicative of movement of the housing 12 relative to an inertial reference frame. In most situations, the inertial reference frame is defined by the direction of gravitational acceleration. The inertial sensor 16 may include any type of inertia sensing device, including accelerometers and gyroscopes. Accelerometers sense and respond to translational accelerations, whereas gyroscopes sense and respond to rotational rates. For both of these types of inertia sensing devices, relative positions of the inertial devices are determined by double integration of the signals generated by the devices over time.

In some implementations, the inertial sensor 16 includes at least two inertia sensing devices that are configured to sense motions in at least two respective directions. For example, in one implementation, the inertial sensor 16 includes two inertia sensing devices that are oriented in orthogonal directions and are operable to sense movements in a plane (e.g., an X-Y plane in a two-dimensional Cartesian coordinate system) corresponding to the surface of the writing medium across which the writing end 14 of the electronic writing device 10 is traced. In another implementation, the inertial sensor 16 includes three inertia sensing devices that are operable to sense movements in three noncollinear directions (e.g., X, Y, and Z directions in a three-dimensional Cartesian coordinate system). This implementation allows motion of the electronic writing device 10 to be tracked independently of the orientation of the writing surface.

The inertial sensor 16 is attached to the housing 12 at a location near the writing end 14 of the electronic writing device 10. This improves the accuracy with which the movement data generated by the inertial sensor 16 correlates with the movements of the writing end 14 of the electronic writing device 10. In some embodiments, a second inertial sensor 18 also generates data indicative of movement of the housing 12 relative to the inertial reference frame. The first and second inertial sensors typically are identical. In these embodiments, the movement data generated by the first and second inertial sensors 16, 18 are combined to determine the motion and orientation of the electronic writing device relative to the inertial reference frame over time. The orientation (i.e., tilt, pitch, and yaw) of the electronic writing device 10 may be computed by correlating the axes measured by inertial sensors 16, 18 to the orientation of the electronic writing device 10. In some implementations, the inertial sensors 16, 18 are located along an axis that is parallel to and overlies the center of gravity of the electronic writing device 10. In these implementations, the rate of change of the $$r' = \frac{a_1 - a_2}{d_1 + d_2}$$

where $a_1$ and $a_2$ are the accelerations measured by inertial sensors 16 and 18, respectively, and $d_1$ and $d_2$ are the respective distances between the inertial sensors 16, 18 and the center of gravity of the electronic writing device 10.

In the embodiment of FIG. 1, the second inertial sensor 18 is located at the distal end of electronic writing device 10 opposite the writing end 14. Positioning the first and second inertial sensors as far apart as possible within the housing 12 improves the accuracy with which the movement of the writing end 14 of the electronic writing device 10 and the orientation of the electronic writing device 10 relative to writing surface may be determined.

In the embodiment of FIG. 1, absolute positions are sensed by an optical sensor 20, which is operable to generate data from light received through an optical input 22 at the writing end 14 of the housing 12. In a writing mode of operation, the data generated by optical sensor 20 corresponds to a two-dimensional area of the writing medium positioned adjacent to the optical input 22. The optical sensor 20 includes at least one imaging device (e.g., a CCD or a CMOS imaging device) that is configured to generate signals proportional to the intensity of light received through the optical input 22 over a one- or two-dimensional area. In some implementations, the optical sensor 20 includes an optical filter that allows only light within prescribed wavelength range to reach the imaging device. In these implementations, the prescribed wavelength range may include wavelengths of light selectively absorbed or emitted by the calibration marks on the writing medium. For example, in some implementations, the calibration marks may be printed on the writing medium using infrared or fluorescent inks, in which case the optical filter selectively passes light within a wavelength range encompassing the infrared or fluorescent spectra of these inks. The optical input 22 may include a lens 24 and other optical components that are configured to direct light received through the optical input 22 to the optical sensor 20. Some implementations also include a light source (e.g., a light emitting diode or a laser diode) that is configured to illuminate the surface of the writing medium through the optical input 22. In these implementations, the optical sensor 20 is configured to detect light from the light source that reflects off the writing medium and returns through the optical input 22.

In the embodiment of FIG. 1, the electronic writing device 10 includes a writing tip 26 that is connected to an ink supply 28. The writing tip is configured to deposit ink from the ink supply 28 onto a writing medium as the writing tip is pressed against and moved across the surface of the writing medium. In other embodiments, the writing tip 26 and the ink supply 28 may be replaced by a different dispensing mechanism and a different corresponding marking agent (e.g., graphite), respectively.

A contact sensor 30 is coupled to the writing tip 26 and is configured to sense when pressure is applied to the tip in an axial direction, such as when the tip 26 contacts the writing surface. The contact sensor 30 may be any type of pressure sensor, including a micro-switch-based pressure sensor, a piezoelectric pressure transducer, and a force-sensing resistor. The contact sensor 30 may be configured as an on-off switch or it may be configured to generate a signal corresponding to the amount of pressure applied to the writing tip 26.

The electronic writing device 10 additionally includes a processing system, 32, a memory 34, an input/output (I/O) interface 36, a battery 38, and a power button 39.

The processing system 32 samples signals from the inertial sensors 16 and 18, the optical sensor 20, and the contact sensor 30. In some implementations, the processing system 32 conditions the signals received from sensors 16, 20, 18, and 30 with one or more signal processing modules, such as a noise filter and an analog-to-digital converter. In addition, as described in detail below, the processing system 32 is operable to compute relative displacement data from inertial movement data corresponding to data generated by the inertial sensors 16, 18. The processing system 32 also is operable to detect calibrated positions from calibration data encoded in optical data generated from light received by the optical sensor 20. The inertial movement data may be data that is received directly from the inertial sensors 16, 18 or it may be inertial sensor data that has been processed by one or more signal processing modules (e.g., a filter or analog-to-digital converter) that are located upstream of the processing system 32. Similarly, the optical data may be data that is received directly from the optical sensor 20 or it may be optical sensor data that has been processed by one or more signal processing modules (e.g., a filter or analog-to-digital converter) located upstream of the processing system 32. The processing system 32 is not limited to any particular hardware or software configuration, but rather it may be implemented in any computing or processing environment, including in digital electronic circuitry or in computer hardware, firmware, or software, and may be supplemented by or incorporated in one or more specially designed ASICs (application-specific integrated circuits).

The memory 34 stores data generated by the processing system 32, including temporary data, intermediate data, data sampled from sensors 16, 20, 18, 30, computed relative displacement data, and calibrated position data. In some implementations, memory 34 is an erasable, rewritable memory chip that holds its content without power, such as a flash RAM or a flash ROM memory chip. Other implementations may use a different type of memory.

The I/O interface 36 provides a hardware interface for communications between the electronic writing device 10 and a remote system. The I/O interface 36 may be configured for wired or wireless communication with the remote system. In some implementations, the I/O interface 36 provides a bi-directional serial communication interface. The remote system may be any type of electronic device or system, including a workstation, a desktop computer, a portable computing device (e.g., a notebook computer, a laptop computer, a tablet computer, and a handheld computer), a cash register or point-of-sale terminal. A docking station may be used to connect the I/O interface 36 to the remote system. In some implementations, the remote system may be located at a location remote from the user. For example, the remote system may be a central server computer located at a remote node of a computer network and data from the electronic writing device 10 may be uploaded to the central server computer from any network node connected to the central server computer.

The battery 38 may be any type of battery that provides a source of direct current (DC), including a rechargeable type of battery (e.g., a nickel metal hydride rechargeable battery of a lithium polymer rechargeable battery) and a non-rechargeable type of battery. The battery 38 supplies DC power to the electrical components of the electronic writing device 10. The power button 39 may be depressed by a user to activate and deactivate an activation switch, which turns on and turns off the electronic writing device 10.

Figure 2:
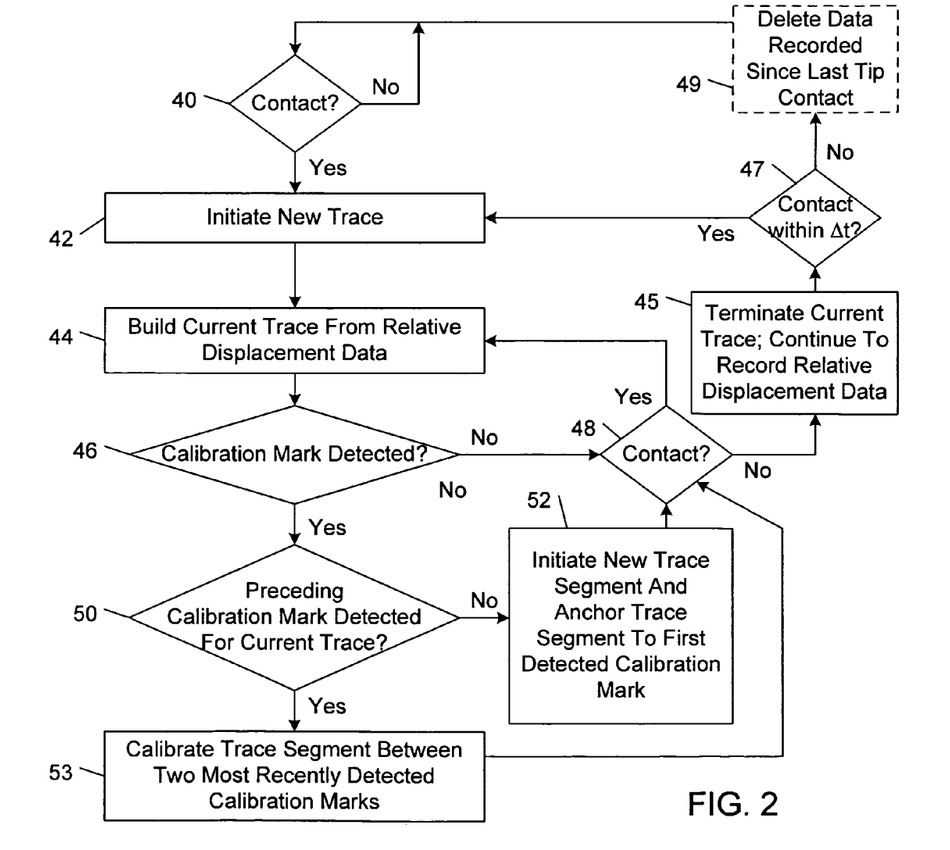
FIG. 2 is a flow diagram of an embodiment of a method of tracking traces of a writing end of an electronic writing device across the surface of a writing medium.

FIG. 2 shows an embodiment of a method of tracking movements of the writing end 14 of the electronic writing device 10 based on the relative displacement data and the calibrated position data generated by processing system 32. In some implementations, this method is performed by a tracking module (TM) 41 that is incorporated in processing system 32 for on-line processing. In other implementations, the tracking module 41 is incorporated in a remote system for off-line processing. The tracking module 41 may be implemented in digital electronic circuitry, computer hardware, firmware, or software.

Movement tracking begins when tip contact is detected based on the signal sampled from the contact sensor 30 (block 40). In some implementations, contact is detected when the signal received from the contact sensor 30 is greater than a predetermined threshold signal level.

After contact has been detected (block 40), a new trace is initiated (block 42). As used herein the term "trace" refers to recorded data that corresponds to a continuous path traversed by the writing end 14 of the electronic writing device 10 that begins when tip contact is detected and ends when tip contact is no longer detected. Individual handwritten characters, for example, may be formed by a single trace (e.g., the letter "c") or multiple traces (e.g., the letter "t"). Similarly, handwritten signatures may consist of a single trace or multiple traces.

After a new trace is initiated (block 42), the current trace is built from relative displacement data that is computed and recorded in memory 34 (block 44). As explained above, computing relative displacement data involves double integrating over time the signals sampled from inertial sensor 16 to obtain data describing the relative position of the writing end 14 of the electronic writing device 10 in two or three dimensions, depending on the specific implementation of the inertial sensor 16. In some implementations, computing relative displacement data also involves double integrating over time the signals sampled from the second inertial sensor 18 to obtain a second set of data describing the relative position of the opposite end of the electronic writing device 10, and combining both sets of relative position data to obtain a final set of relative displacement data.

The current trace is built (or computed) until a calibration mark is detected (block 46) or tip contact is no longer detected (block 48). A calibration mark is detected based on the data obtained from optical sensor 20. This data may or may not be subjected to one or more forms of signal processing before being received by processing system 32. The particular method of detecting a calibration mark is implementation-specific and depends on the type or types of calibration marks carried by the particular writing medium for which the electronic writing device 10 is designed. For example, in some implementations, the calibration marks consist of specially-designed, optically detectable markings each of which encodes information describing the absolute position of the calibration mark on the writing medium. The absolute position information may be encoded in a one- or two-dimensional array of dots, lines, curves, or other marking pattern that is capable of uniquely identifying the position of a calibration mark on the writing medium. If tip contact is no longer detected (block 48), the processing system 32 terminates the current trace; the system, however, continues to compute and record relative displacement data in memory 34 (block 45) until expiration of a delay period (Δt) (block 47). The delay period corresponds to an empirically determined length of time typically needed to reposition tip 26 when writing or printing, such as when crossing a "t", dotting an "i", or starting a new character. If tip contact is detected within the delay period (block 47), a new trace is initiated (block 42) at a position that is calibrated to the previous trace based on the relative displacement data recorded in block 45. If tip contact is not detected within the delay period (block 47), the relative displacement data that was recorded since the last tip contact was detected may be deleted (optional block 49).

After a calibration mark has been detected for a current trace (block 46), it is determined whether a preceding calibration mark has been detected for the current trace (block 50). If the detected calibration mark is the first calibration mark detected for the current trace (block 50), a new trace segment is initiated for the current trace and the trace segment is anchored to the first detected calibration mark (block 52). After the new trace segment is initiated (block 52), relative displacement data is again computed and recorded in memory 34 (block 44) if the writing tip 26 remains in contact with the writing surface (block 48); otherwise, the processing system terminates the current trace and waits for a subsequent tip contact to be detected (block 40) before initiating a new trace (block 42).

If a preceding calibration mark has been detected for the current trace (block 50), the trace segment between the two most recently detected calibration marks is calibrated to these calibration marks, as explained in detail below in connection with FIG. 3B (block 53). The process checks for tip contact (block 48) and then continues to build the current trace as described above.

Figure 3A:
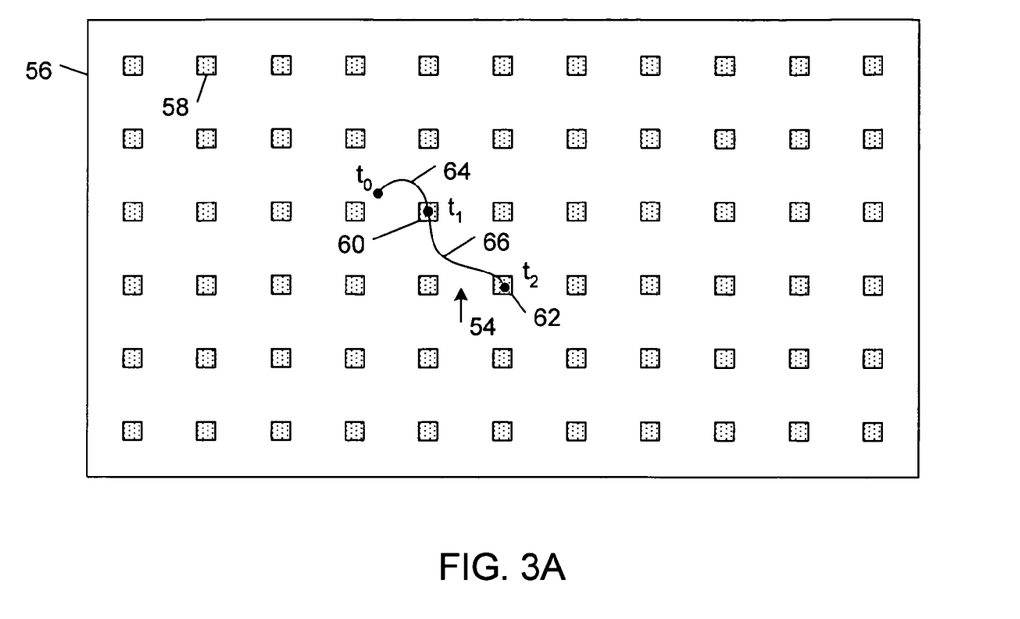
FIG. 3A is a diagrammatic top view of an actual path traversed by a writing tip of an electronic writing device across the surface of a writing medium.

FIG. 3A shows an exemplary illustration of a path 54 that is traversed by the writing tip 26 of the electronic writing device 10 across a writing surface of a writing medium 56. The writing medium 56 includes an array of calibration marks 58 each of which includes an optically detectable pattern that uniquely encodes a respective absolute position on the writing medium 56. In this exemplary illustration, the initial contact between the writing tip 26 and the writing surface of the writing medium 56 occurs at time $t_0$. The writing tip 26 remains in contact with the writing surface while it traverses a course through a first calibration mark 60 at time $t_1$ and a second calibration mark 62 at time $t_2$. At time $t_2$ the writing tip 26 is pulled away from and therefore no longer in contact with the writing surface. The path 54 consists of a first path segment 64, which was traversed between times $t_0$ and $t_1$ and a second path segment 66, which was traversed between times $t_1$ and $t_2$.

Figure 3B:
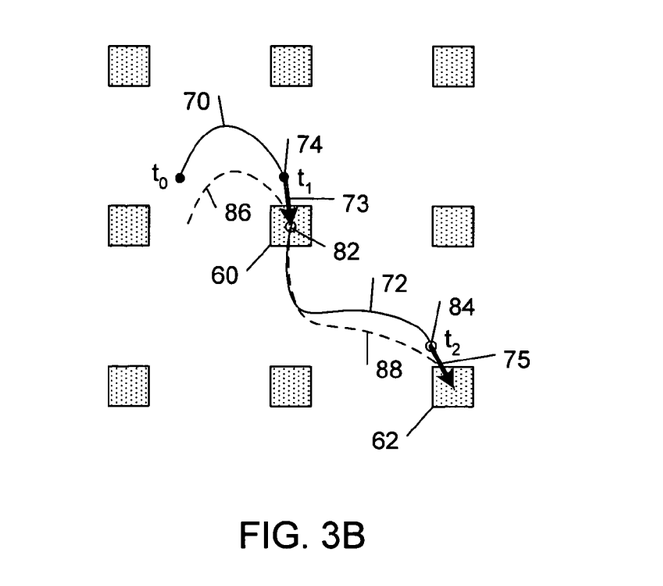
FIG. 3B is a diagrammatic top view of virtual trace segments corresponding to the trace of FIG. 3A that are generated from inertial sensor data, and calibrated versions of the virtual trace segments that are anchored to position calibration marks detected on the surface of the writing medium.

FIG. 3B shows the initial relative displacement data and the corresponding calibrated relative displacement data computed in accordance with the method of FIG. 2 based on the exemplary actual path traversed by writing tip 26 shown in FIG. 3A. The first trace segment 70 is recorded between times $t_0$ and $t_1$ and corresponds to path segment 64. The second trace segment 72 is recorded between times $t_1$ and $t_2$ and corresponds to path segment 66. Before the first calibration mark 60 is detected (blocks 46, 50, 52), the computed relative displacement data defines the first trace segment 70 in a way that is not anchored to any absolute position on the writing surface. In addition, drift and other deleterious effects distort the recorded trace segments 70, 72 relative to the path segments 64, 66 that actually are traversed by the writing tip 26. These effects are inherent in most practical inertial sensor implementations and tend to accumulate over time unless corrected.

In the method of FIG. 2, inertial sensor distortions are corrected by anchoring endpoints of the recorded trace segments to calibrated positions encoded in the calibration marks 60, 62 and transforming trace segment points located between the anchored endpoints. To this end, the endpoint 74 (recorded at time $t_1$) of the first trace segment 70 is anchored to the first calibration mark 60. In the example illustrated in FIG. 3A, because the first trace segment 70 can be anchored to only a single calibration mark, each point of the first trace segment 70 is translated by the same amount corresponding to the magnitude and direction of a displacement vector 73 between the endpoint 74 and the centroid of the first calibration mark 60 to produce the calibrated trace segment 86 shown in FIG. 3B. The displacement vector is computed from the difference between the absolute position (e.g., $x_{ABS,1}$, $y_{ABS,1}$) encoded by the first calibration mark 60 from the recorded relative position (e.g., $x_{REL,1}$, $y_{REL,1}$) of the endpoint of the first trace segment 70. The second trace segment 72, on the other hand, may by calibrated to both the first and second calibration marks to produce the calibrated trace segment 88 shown in FIG. 3B.

Figure 4:
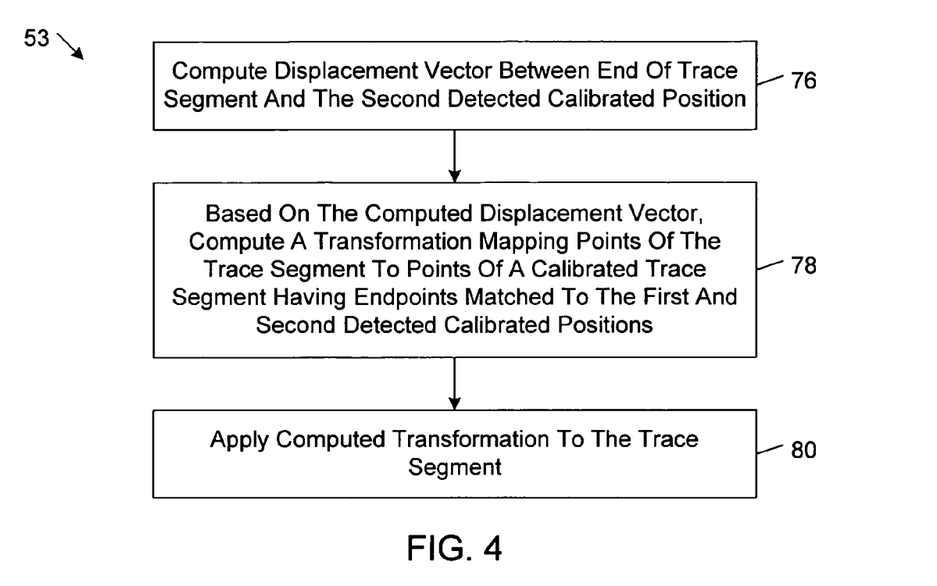
FIG. 4 is a flow diagram of an embodiment of a method of calibrating a trace segment between two detected calibration marks.

Referring to FIG. 4, in some embodiments, the second trace segment 72 is calibrated to both the first and second calibration marks as follows. A displacement vector 75 between the end of the second trace segment 72 and the centroid of the second calibration mark 62 is computed (block 76). The displacement vector is computed from the difference between the absolute position (e.g., $x_{ABS,2}$, $y_{ABS,2}$) encoded by the second calibration mark 62 from the recorded relative position (e.g., $x_{REL,2}$, $y_{REL,2}$) of the endpoint 84 of the second trace segment 72. Based on the computed displacement vector 75, a transformation (or transform) mapping points of the second trace segment 72 to points of a calibrated trace segment 88 having endpoints anchored to the first and second calibration marks 60, 62 is computed (block 78). The computed transformation is applied to the second trace segment 72 to generate the calibrated trace segment 88 (block 80). In the example illustrated in FIG. 3B, the starting point 82 (recorded at time $t_1$) of the second trace segment 72 is anchored to the centroid of first calibration mark 60 and the endpoint 84 of the second trace segment 72 is anchored to the centroid of the second calibration mark 62. The computed transform is applied to the points of the second trace segment 72 to correct for drift and other deleterious effects inherent in the inertial measurements. In some implementations, a linear transform is applied to each point of the second recorded trace 72. In other implementations, a non-linear transform is applied to each point of the second recorded trace 72.

After calibration, the tracked movement data corresponding to writing tip path 54 consists of first and second calibrated trace segments 86, 88. In this way, relative motion sensing technology is combined with absolute position sensing technology to track movements of the writing end 14 of the electronic writing device 10 with high accuracy.

The movement tracking method described above incorporates real-time calibration of the computed relative movement data on a segment-by-segment basis between successively detected calibration marks. In other embodiments, the relative displacement data may be calibrated off-line (e.g., after all of the relative displacement data for a current trace has been recorded). In addition, in some embodiments, rather than calibrate the relative displacement data on a segment-by-segment basis, the relative displacement data may be anchored to the detected calibration marks on a global (e.g., trace level) basis using, for example, curve fitting or regression-type data processing methods.

Figure 5:
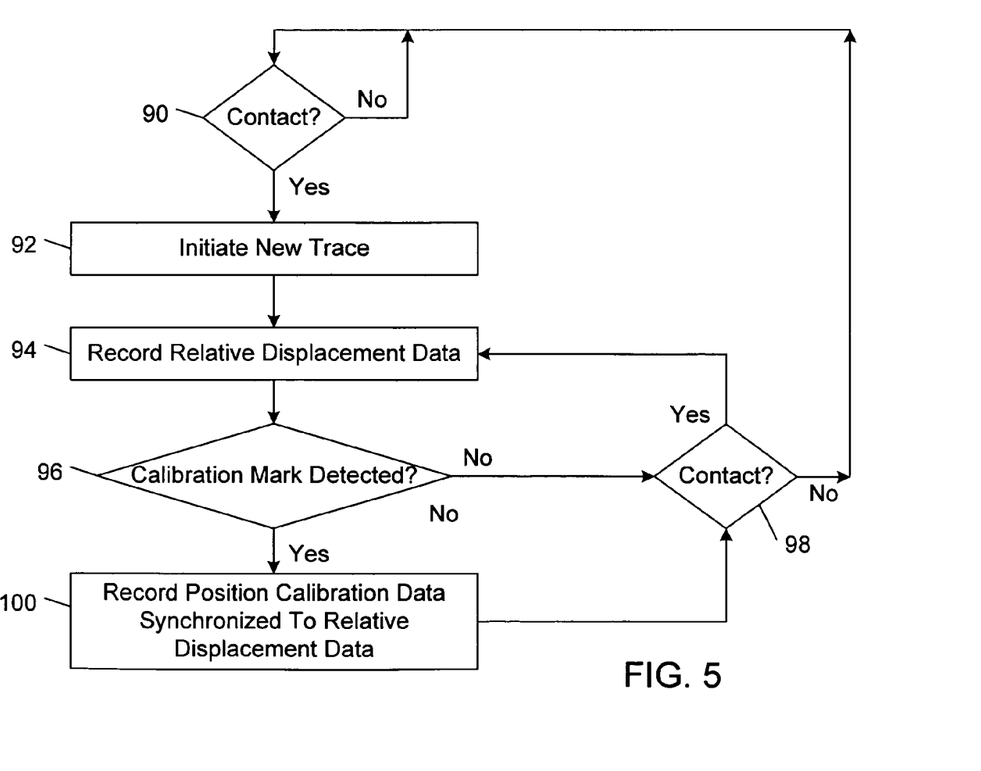
FIG. 5 is a flow diagram of an embodiment of a method of tracking traces of a writing end of an electronic writing device across the surface of a writing medium.

FIG. 5 shows an embodiment of a method by which the processing system 32 computes and records relative displacement data and calibrated position data. In this embodiment, movement tracking begins when tip contact is detected based on the signal received from contact sensor 30 (block 90). In some implementations, contact is detected when the signal received from contact sensor 30 is greater than a predetermined threshold signal level.

After contact has been detected (block 90), a new trace is initiated (block 92). After a new trace is initiated (block 92), relative displacement data is computed and recorded in memory 34 (block 94). As explained above, computing relative displacement data involves double integrating over time the signals received from inertial sensor 16 to obtain data describing the relative position of the writing end 14 of the electronic writing device 10 in two or three dimensions, depending on the specific implementation of the inertial sensor 16. In some implementations, computing relative displacement data also involves double integrating over time the signals received from the second inertial sensor 18 to obtain a second set of data describing the relative position of the opposite end of the electronic writing device 10, and combining both sets of relative position data to obtain a final set of relative displacement data.

The computed relative displacement data is recorded in memory 34 (block 94) until a calibration mark is detected (block 96) or tip contact is no longer detected (block 98). A calibration mark may be detected based on the data obtained from optical sensor 20 in accordance with the method of FIG. 2. If tip contact is no longer detected (block 98), the processing system terminates the current trace and waits for a subsequent tip contact to be detected (block 90) before initiating a new trace (block 92).

After a calibration mark has been detected for a current trace (block 96), position calibration data that is synchronized to the computed relative displacement data is recorded in memory 34 (block 100). The process checks for tip contact (block 98) and then continues to build the current trace as described above.

In some implementations, the information generated by the processing system 32 is transmitted to a tracking module that is incorporated in a remote system coupled to the electronic writing device 10. The remote tracking module may be configured to compute calibrated movement data based on the relative displacement data and the calibrated position data in accordance with the method described above. The remote tracking module may be implemented in digital electronic circuitry, computer hardware, firmware, or software. In some implementations, the remote tracking module consists of machine-readable instructions (e.g., computer code) that are stored on a machine-readable medium (e.g., a CD ROM).

Other embodiments are within the scope of the claims.

What is claimed is:

1. An electronic writing system, comprising:
an elongated housing having an optical input;
an inertial sensor attached to the housing and operable to generate data indicative of movement of the housing relative to an inertial reference frame;
an optical sensor attached to the housing and operable to generate data from light received through the optical input; and
a tracking module operable to determine relative displacement data from inertial movement data corresponding to data generated by the inertial sensor, detect at least one calibrated position from calibration data encoded in optical data generated from the light received by the optical sensor, compute a trace corresponding to movement of the housing from the relative displacement data, and transform at least a portion of the trace into a calibrated trace based on the detected calibrated position.

2. The electronic writing system of claim 1, wherein the housing is sized and shaped in the form of a writing instrument.

3. The electronic writing system of claim 1, wherein the inertial sensor is operable to generate data indicative of movement of the housing in three dimensions relative to the inertial reference frame.

4. The electronic writing system of claim 1, wherein the inertial sensor comprises at least one of an accelerometer and a gyroscope.

5. The electronic writing system of claim 1, wherein the optical sensor comprises a light detector.

6. The electronic writing system of claim 1, wherein the tracking module is incorporated in a processing system attached within the housing.

7. The electronic writing system of claim 1, wherein the tracking module is incorporated in a processing system separated from the housing and disposed at a location remote from the housing.

8. The electronic writing system of claim 1, wherein the tracking module is operable to transform the computed relative displacement data such that the calibrated trace intersects the detected calibrated position.

9. The electronic writing system of claim 1, wherein the computed trace corresponds to a path followed by an end of the housing across a writing surface.

10. The electronic writing system of claim 1, wherein the tracking module is operable to begin a segment of the computed trace at a first detected calibrated position.

11. The electronic writing system of claim 10, wherein the tracking module is operable to compute the trace segment from the inertial movement data.

12. The electronic writing system of claim 11, wherein the tracking module is operable to scale the computed trace segment to anchor an endpoint of the trace segment to a second detected calibrated position.

13. The electronic writing system of claim 1, further comprising a marking agent disposed in the housing.

14. The electronic writing system of claim 1, further comprising a medium comprising a set of optically detectable position calibration marks.

15. The electronic writing system of claim 1, further comprising a writing tip located at a writing end of the housing, and a contact sensor configured to measure pressure applied to the writing tip.

16. The electronic writing system of claim 15, wherein the tracking module is operable to compute a trace corresponding to a path followed by the writing end of the housing across a writing surface based on measurement of pressure applied to the writing tip.

17. The electronic writing system of claim 16, wherein the tracking module is operable to calibrate a new trace to a previously computed trace based on the computed relative movement data.

18. The electronic writing system of claim 17, wherein the tracking module calibrates the new trace to the previously computed trace only when a delay period between a last detected tip contact for the previously computed trace and a first detected tip contact for the new trace is within a predetermined delay threshold.

19. An electronic writing system, comprising:
an elongated housing having an optical input;
an inertial sensor attached to the housing and operable to generate data indicative of movement of the housing relative to an inertial reference frame;
a first optical sensor attached to the housing and operable to generate data from light received through the optical input;
a second inertial sensor attached to the housing and operable to generate data indicative of movement of the housing relative to the inertial reference frame; and
a tracking module operable to compute relative displacement data from inertial movement data corresponding to data generated by the inertial sensor and to detect at least one calibrated position from calibration data encoded in optical data generated from the light received by the optical sensor, wherein the tracking module is operable to compute relative displacement data from inertial movement data corresponding to data generated by the first and second inertial sensors.

20. The electronic writing system of claim 19, wherein the first and second inertial sensors are located at opposite distal ends of the housing.

21. A device-implemented electronic writing method, comprising:
generating inertial data indicative of movement of an elongated housing of an electronic writing instrument relative to an inertial reference frame;
generating optical data from light received through an optical input of the housing;
determining relative displacement data from the inertial data;
detecting at least one calibrated position from calibration data encoded in the optical data;
computing a trace corresponding to movement of the housing from the relative displacement data; and
transforming at least a portion of the trace into a calibrated trace based on the detected calibrated position.

22. The electronic writing method of claim 21, wherein the computing comprises transforming the relative displacement data such that the calibrated trace intersects the detected calibrated position.

23. The electronic writing method of claim 21, wherein the computed trace corresponds to a path followed by an end of the housing across a writing surface.

24. The electronic writing method of claim 23, wherein the computing comprises beginning a segment of the computed trace at a first detected calibrated position.

25. The electronic writing method of claim 24, wherein the trace segment is computed from the inertial movement data.

26. The electronic writing method of claim 25, wherein the transforming comprises scaling the computed trace segment such that an endpoint of the scaled trace segment coincides with a second detected calibrated position.

27. The electronic writing method of claim 21, wherein the generating comprising generating a first set of inertial data indicative of movement of a first end of the housing and generating a second set of inertial data indicative of movement of a second end of the housing opposite the first end, and the determining comprises determining the relative displacement data from the first and second sets of inertial data.

28. A machine-readable medium storing machine-readable instructions for causing a machine to:
compute relative displacement data from inertial data indicative of movement of an elongated housing of an electronic writing instrument relative to an inertial reference frame;
detect at least one calibrated position from calibration data encoded in optical data generated from light received through an optical input of the housing;
compute a trace corresponding to a path followed by an end of the housing across a writing surface from the relative displacement data; and
transform at least a portion of the trace into a calibrated trace based on the at least one detected calibrated position.

* * * * *

UNITED STATES PATENT AND TRADEMARK OFFICE
CERTIFICATE OF CORRECTION

PATENT NO.         : 7,342,575 B1                                    Page 1 of 1
APPLICATION NO.  : 10/818599
DATED              : March 11, 2008
INVENTOR(S)        : Peter G. Hartwell et al.

It is certified that error appears in the above-identified patent and that said Letters Patent is hereby corrected as shown below:

In column 4, line 4, after "of the" insert -- raw rate (r′) is given by: --.

Signed and Sealed this

Twenty-sixth Day of August, 2008

JON W. DUDAS
*Director of the United States Patent and Trademark Office*